United States Patent [19]

Schneider

[11] 4,381,670

[45] May 3, 1983

[54] SUPPORT SYSTEM FOR HARD BEARING BALANCING MACHINES

[75] Inventor: Hatto G. A. Schneider, Heppenheim, Fed. Rep. of Germany

[73] Assignee: Carl Schenck AG, Fed. Rep. of Germany

[21] Appl. No.: 235,673

[22] Filed: Feb. 18, 1981

[30] Foreign Application Priority Data

Mar. 22, 1980 [DE] Fed. Rep. of Germany ....... 3011110

[51] Int. Cl.³ ............................................. G01M 1/04
[52] U.S. Cl. ........................................ 73/471; 73/479
[58] Field of Search .................................. 73/471–473, 73/475–477, 478, 479, 460

[56] References Cited

U.S. PATENT DOCUMENTS

| | | | |
|---|---|---|---|
| 2,329,654 | 9/1943 | Rouy | 73/475 X |
| 2,461,645 | 2/1949 | Kallmann | 73/473 X |
| 2,534,918 | 12/1950 | Kroft et al. | 73/475 X |
| 3,871,234 | 3/1975 | Langlois | 73/460 |

Primary Examiner—James J. Gill
Attorney, Agent, or Firm—Connolly and Hutz

[57] ABSTRACT

The invention relates to a support system for hard bearing balancing machines for the support of rotational bodies for measuring the effects of imbalance on a mounting plate for the bodies by pickups.

10 Claims, 3 Drawing Figures

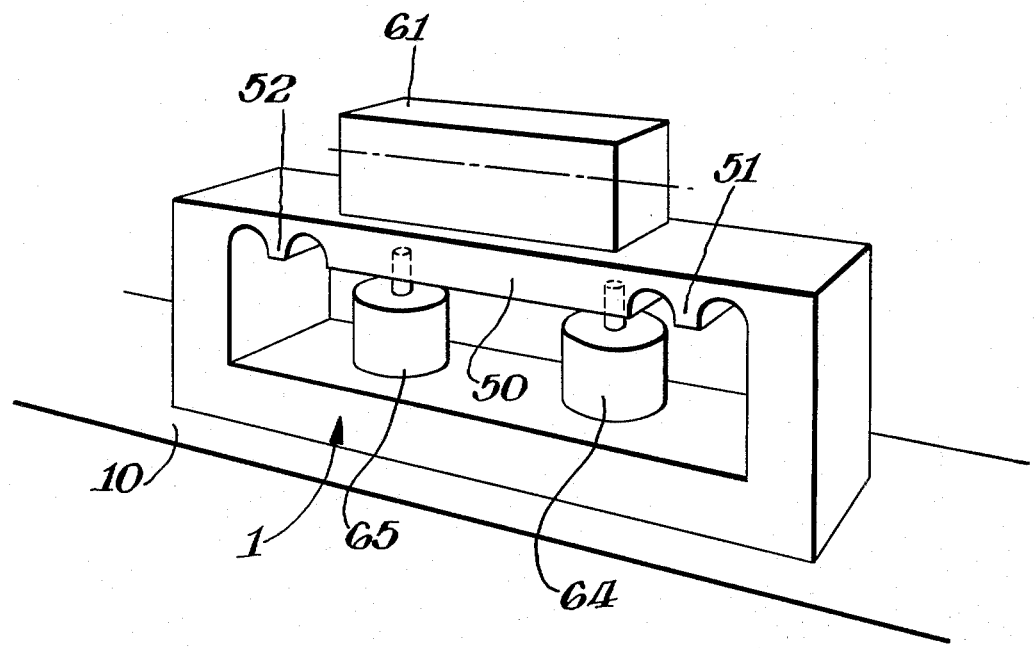

SUPPORT SYSTEM FOR HARD BEARING BALANCING MACHINES

CROSS REFERENCE TO RELATED APPLICATIONS

None.

BACKGROUND OF THE INVENTION

DE-PS No. 19 37 865 corresponding to U.S. Pat. No. 3,584,512, discloses a bearing stand for balancing machines for supporting a rotor to be balanced having a horizontal axis held in compound bearings, wherein the bearing bridge is mounted by means of leaf springs extending from a support base, which is characterized in that a medium leaf spring is disposed under the center of the bearing bridge, with its flat side arranged in the direction of the axis of the body, and two other leaf springs are arranged laterally with their flat sides disposed in the measuring direction. Such support stands are suitable for the balancing of complete assemblies, but require special care with respect to their production. A measurement of the forces due to the imbalance contained in an assembly occurs in the known device by a horizontal movement of the parallely-guided bearing bridge, this horizontal movement being scanned by way of an oscillation transducer per measuring plane.

Emanating from this state of the art, it is the object of the current invention essentially to simplify the support system and to reduce thereby the manufacturing outlay for such a system.

SUMMARY

This object is solved, according to the invention, in that the mounting plate for the rotational body is connected with a mounting base and has at least two joints per measuring plane, allowing a rotational movement, that the axis of the joints proceed at right angles to the axis of the rotational body and that the forces or displacements on the mounting plate produced by the imbalance are taken up by oscillation transducers. By the use of joints allowing rotational movements, a support system is provided in a manner easy to observe and with a low cost of construction, which allows the determination of the imbalance existing in an assembly in the form of forces or displacements.

If the joints are designed with a certain stiffness relative to the mounting base, it is proposed according to the invention that for measuring the imbalance effects the forces or displacements produced by the imbalance be taken up at the mounting plate by one oscillation transducer per measuring plane.

In the event of the measurement of the effects of imbalance beyond the joints, it is proposed by the invention that the forces or displacements transmitted by the joints be taken up by one oscillation transducer per measuring plane.

These juxtaposed developments of the invention subject matter make it possible to undertake a measurement of the effects of imbalance in an observable manner and at several points of the support system, existing independently of each other.

In a further development of the subject matter of the invention, it is proposed that there be provided two joints per measuring plane and an appendage arranged between them for each oscillation transducer. By arranging an appendage between two joints per measuring plane, it is achieved that an oscillation transducer may be coupled at an arbitrary point and an arbitrary lever transmission may be achieved by the respective adaptation of the appendage. An optimum adaptation of the support system to the oscillation transducer is provided thereby, the transducers being pickups for displacement, velocity, or force.

It is considered to be a particularly advantageous development if the mounting plate, joints and the mounting base are constructed in one piece. As a result of the one-piece construction, a support system is provided in a particularly simple manner by torch cutting or casting on which an entire assembly may be arranged for testing.

In a development of this novel idea, it is proposed that such a compact receiving unit carry adjustable bearings for supporting the rotors to be balanced.

In a further development of the subject matter of the invention, it is proposed that the joints have variable stiffness. By selecting the stiffness, the position of the effective supporting planes and the total stiffness of the measuring object may be adapted.

As a still further development of the inventive subject matter, it is viewed that the dimensions of the joints, the spacing between the joints and the dimensions of the appendage are in a certain proportion to each other.

If assemblies are to be tested as to their imbalance, which, regarding their mass and/or their correction planes are asymmetric to the joints of the support system, it is proposed, in accordance with the invention, to select the stiffness of the joint pairs to be different. This produces an optimum measuring condition. If force pickups are used for the conversion of the imbalance oscillations, an optimum adaptation to the measuring problem, according to the invention is given in that pickups having different characteristics are employed in both planes. Here, the characteristic of the force pickups means the stiffness and the measuring sensitivity thereof.

BRIEF DESCRIPTION OF THE DRAWING

Novel features and advantages of the present invention will become apparent to one skilled in the art from a reading of the following description in conjunction with the accompanying drawings wherein similar reference characters refer to similar parts and in which:

FIG. 3 is a pictorial view of a further support system which is a further embodiment of this invention wherein the imbalance effects on the mounting plate are measured directly.

DESCRIPTION OF THE PREFERRED EMBODIMENTS

Figure 1:
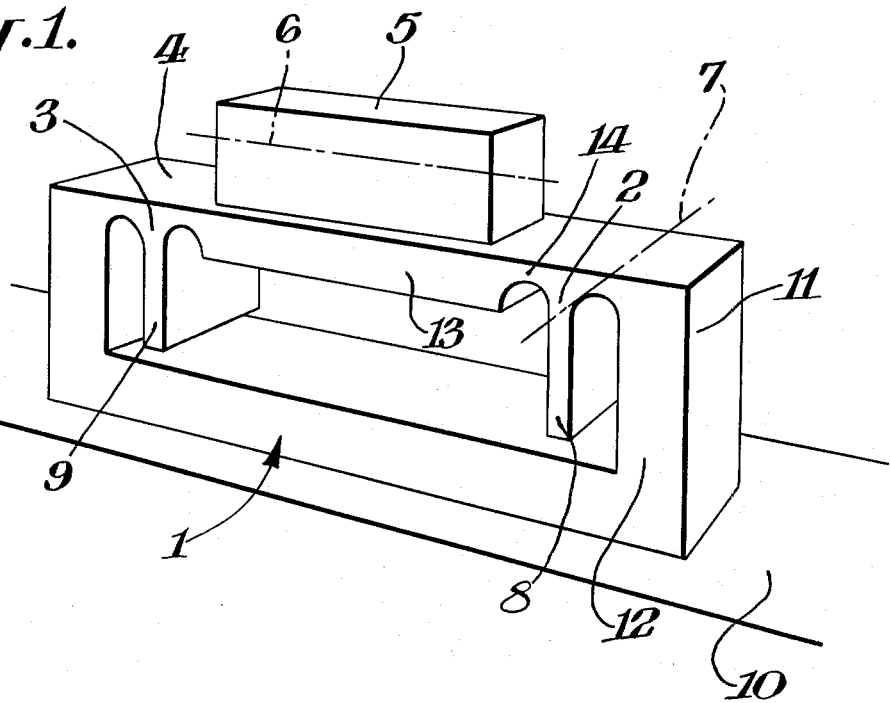
FIG. 1 is a pictorial view of a support system which is one embodiment of this invention having a one-piece construction.

According to FIG. 1, a mounting base is constructed in one piece with two support systems 2, 3, and a mounting plate 4. On the compact support system, comprising structural units 1, 2, 3, there is mounted an assembly 5, for example a rotor, on mounting plate 4, for example, whose rotational axis 6 proceeds perpendicularly to articulation axis 7 of the support system, a rotational movement being enabled about the articulation axis 7. A non-illustrated oscillation transducer engages with appendage 8 and converts the movements of the appendage or the forces associated with this appendage, subsequent to the effects of the imbalance, into electrical signals, these signals being present as analog, digital or pulse signals, depending on the type of oscillation transducer. A further appendage 9, as already described in connection with articulation axis 7 and appendage 8, is similarly deflected as a result of the imbalance setting in the other measuring plane of assembly 5 and similarly produces respective electrical signals.

In place of the embodiment as illustrated in FIG. 1, in which the mounting base is set on a plane 10, the compact support system of FIG. 1, rotated by 90° may also be set on a side surface 11 on plane 10 without thereby harmfully affecting the manner of operation of the compact support system. Even if assembly 5 is moved into an area 13 of the side surface 12, the novel support system is fully functional.

A further joint 14, which is arranged between appendage 8 and area 13, serves for transmitting the forces from plate 4 to the joint with the articulation axis 7. It is obvious from this that following a change of the further joint 14 relative to the joint with the flexible axis 7, a modulation of the effective support of assembly 5 is achieved; similarly, by dimensioning the appendage 8, a modulation of the transmission of the signals is possible to various kinds of oscillation transducers.

Figure 2:
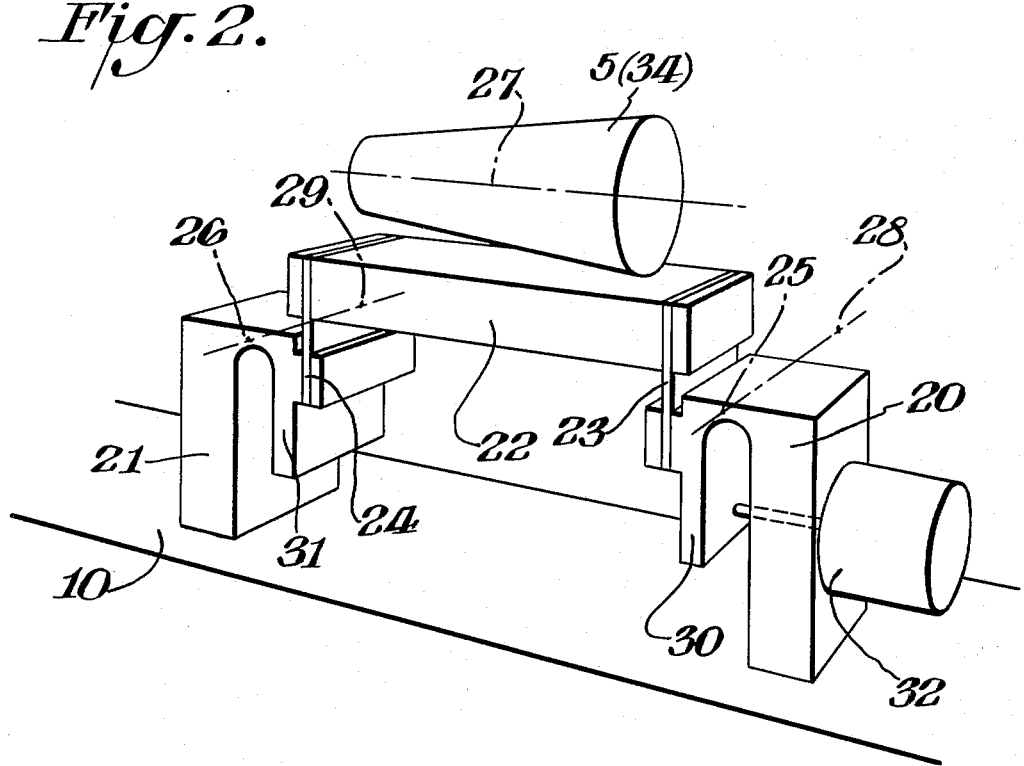
FIG. 2 is a pictorial view of another support system which is another embodiment of this invention having two structural groups, both structural groups being rigidly connected together.

In FIG. 2 a further embodiment of the novel subject matter is illustrated, wherein a right support system 20 and a left support system 21 are connected by means of a mounting plate 22 and to the leaf springs 23, 24 mounted thereon. The leaf springs 23, 24 act here as a joint for force transmission, while joints 25, 26 serve as swivel joints for the independent determination of the imbalance per measuring plane of assembly 5. Here too, the rotational axis 27 of assembly 5 is perpendicular to the joint axis 28, 29 of joints 25, 26. By means of appendages 30, 31, an oscillation transducer 32 is affected per measuring plane, e.g. for the right plane of the right support system 20, and converts the mechanical oscillations into electrical signals.

If assembly 5 relates to a greatly asymmetrical unit 34, joint 26, according to the invention, should be constructed weaker than joint 25.

FIG. 3 shows a support system, wherein the imbalance effects are measured directly on a mounting plate 50. Mount base 1 is connected with mounting plate 50 by means of joints 51, 52, which have a preset stiffness. Due to the predetermined stiffness of these joints 51, 52, it is possible to convert the imbalance effects emanating from an assembly 61 through oscillation transducers 64, 65 into electrical information; the oscillation transducers 64, 65 may be in the form of force-measuring pickups, e.g. piezocrystals, which convert the imbalance oscillations emanating from assembly 61. Under normal conditions, the stiffness of joints 51, 52 may be low here in order to lessen the strength of the force as little as possible on oscillation transducers 64, 65. The stiffness may also be utilized, however, in order to achieve the preload often required with force transducers. Oscillation transformers 64, 65 may also be in the form of displacement measuring or velocity-measuring transducers, however. The action of force here, produced by the effect of imbalance of assembly 61, must be compensated by joints 51, 52, so that merely the movement of mounting plate 50 is conducted to oscillation transducers 64, 65.

I claim:

1. A support system for hard bearing balancing machines for taking up a rotational body having an axis of rotation and having oscillation transducers for measuring the imbalance, comprising a mounting plate for the rotational body, the mounting plate having at least two joints permitting articulation for each measuring plane, the mounting plate being secured to a mounting base, the joints each having an axis, the axis of the joints proceeding at right angles to the axis of the rotational body, the mounting plate being subjected through the imbalance to a force or displacement, and an oscillation pickup transducer being constructed and arranged to take up the force or the displacement in each measuring plane.

2. A support system as set forth in claim 1, characterized in that an oscillation transducer is provided for each measuring plane to take up the force or displacement produced by the imbalance at the mounting plate.

3. A support system as set forth in claim 1, characterized in that the forces or displacements transmitted through the joints are taken up by an oscillation transducer per measuring plane.

4. A support system as set forth in any one of claims 1, 2 or 3, characterized in that the mounting plate, joints and mounting base are constructed and arranged in a one piece construction.

5. A support system as set forth in any one of claims 1, 2 or 3, characterized in that two joints per measuring plane and an appendage arranged between them are provided for each oscillation transducer.

6. A support system as set forth in any one of claims 1, 2 or 3, characterized in that the joints each have different stiffness.

7. A support system as set forth in any one of claims 1, 2 or 3, characterized in that two joints per measuring plane and an appendage arranged between them are provided for each oscillation transducer, and that the joints, the spacing between the joints and the appendage have dimensions, and the dimensions being proportioned relative to each other.

8. A support system as set forth in any one of claims 1, 2 or 3, characterized in that a joint pair is provided per measuring plane, and the stiffness of the joint pairs being different from each other.

9. A support system as set forth in any one of claims 1, 2 or 3, characterized in that the rotational body to be balanced is a rotor, and the mounting plate is provided with bearings of the rotor to be balanced.

10. A support system as set forth in claim 2, characterized in that the oscillation pickup for both planes have different characteristics.

* * * * *